April 20, 1937.  W. B. BRONANDER  2,077,457
INTERNAL COMBUSTION ENGINE
Filed Oct. 7, 1931  2 Sheets-Sheet 1

INVENTOR
Wilhelm B. Bronander
BY
Marshall & Hawley
ATTORNEYS

April 20, 1937.  W. B. BRONANDER  2,077,457
INTERNAL COMBUSTION ENGINE
Filed Oct. 7, 1931  2 Sheets-Sheet 2
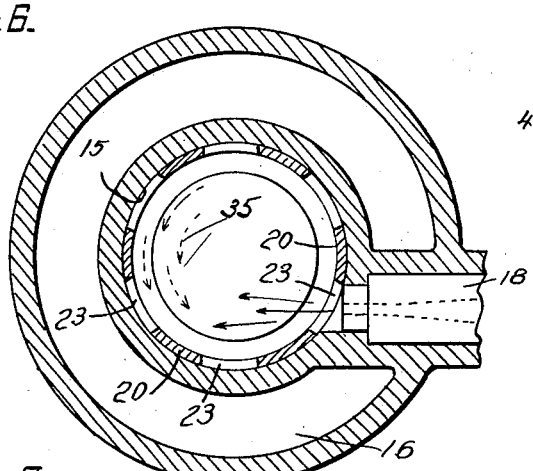
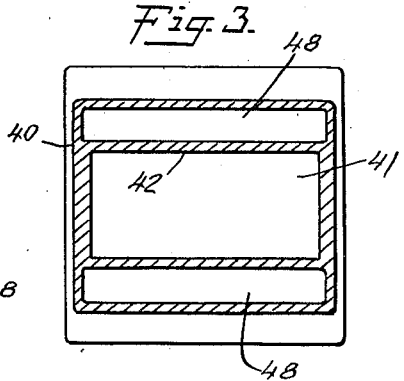
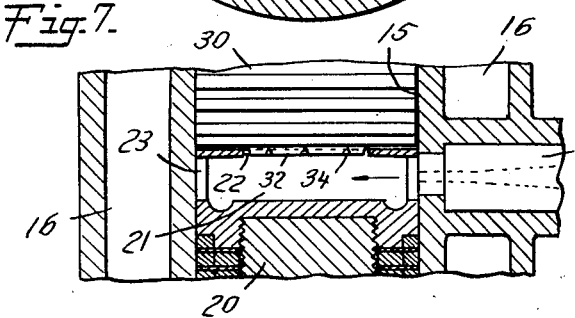
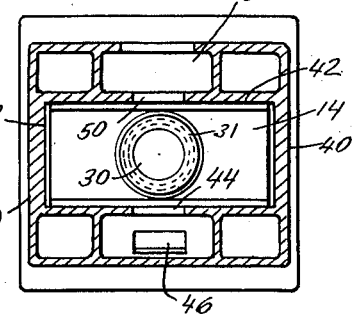
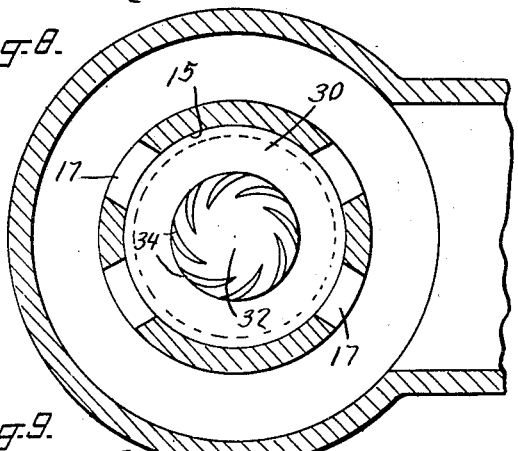
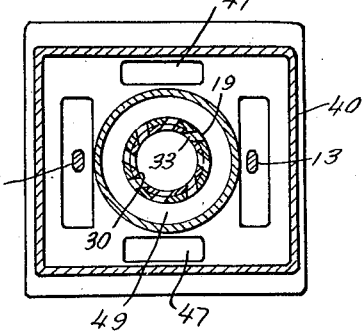
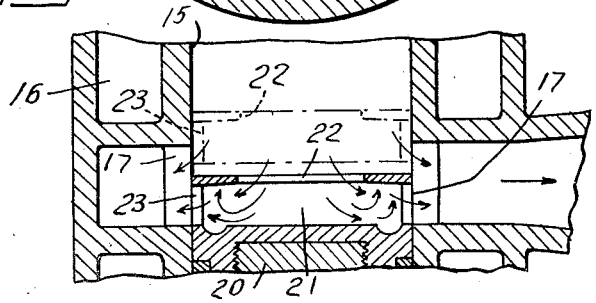
INVENTOR
Wilhelm B. Bronander
BY
Marshall & Hawley
ATTORNEYS Patented Apr. 20, 1937

2,077,457

UNITED STATES PATENT OFFICE 2,077,457

INTERNAL COMBUSTION ENGINE

Wilhelm B. Bronander, Montclair, N. J., assignor to The Safety Car Heating & Lighting Company, New Haven, Conn., a corporation of New Jersey Application October 7, 1931, Serial No. 567,355

14 Claims. (Cl. 123—32)

This invention relates to improvements in internal combustion engines of the opposed piston Diesel type and its object is to provide an engine of simple construction and great efficiency.

A further object is to provide a novel arrangement for insuring thorough scavenging and better distribution of the fuel.

A specific object of the invention is to provide in one of the piston heads a definite chamber into which the fuel is injected, with ports so arranged that the scavenging air passes into and out of the chamber thus formed and the fuel is introduced into such of the air as is entrapped in the chamber in such a manner as to become instantly admixed therewith.

These and other objects will appear from the following specification in which I will describe the invention, the specific features of which will be pointed out in appended claims.

Referring to the drawings,

Figs. 1 and 2 are sectional elevations at right angles to each other, of an engine which is made according to and embodies this invention;

Figs. 3, 4 and 5 are sectional plan views, the sections being taken respectively on the lines 3—3, 4—4 of Fig. 2 and 5—5 of Fig. 1;

Fig. 6 is a sectional plan view on a larger scale, the section being taken on the line 6—6 of Fig. 2;

Fig. 7 is a sectional elevation on a similar scale of the parts shown in Fig. 6;

Fig. 8 is a sectional plan view, the section being taken on the line 8—8 of Fig. 1, showing the bottom of the upper working piston;

Fig. 9 is a sectional elevation of the parts shown in Fig. 8, two positions of one of the pistons being shown;

Figure 2:
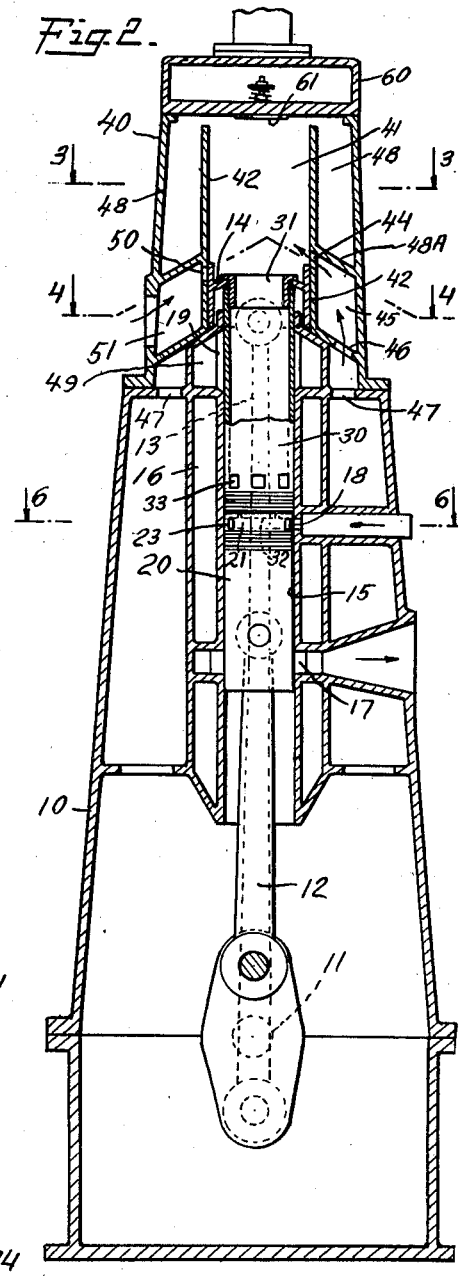

10 designates the frame of the engine in which is mounted the crank shaft 11. This has one crank connected by a rod 12 with a working piston 20 and two cranks opposed to the first mentioned crank, connected by rods 13, 13 with a yoke 14 which supports the other working piston 30. The pistons 20 and 30 are in a cylinder 15 which, as may be seen from Fig. 2, is integral with the frame 10. 16 is its water jacket, 17 the exhaust ports and 18 a fuel inlet port. 19 designates elongated air ports in the cylinder. These are cut obliquely through the cylinder wall, as shown in Fig. 5.

40 is the head of the engine. It is constructed to form an oblong rectangular compression chamber 41 having flat walls parallel with the axis of the cylinder 15. The yoke 14 reciprocates in this air chamber and forms a piston therein. The longer sides 42 of the yoke are flat, as shown in Figs. 2 and 4. The ends 43 of the yoke which contact with the shorter walls of the air chamber 41 may be curved as shown, to prevent jamming.

The piston 30 is affixed to the yoke 14 by means of a hollow flanged cap 31, the shank of which is provided with threads which fit internal threads in the upper end of the piston. Piston 30 is hollow except at its lower end where it is provided with a projecting boss 32. 33 designates ports through the wall of the piston which, during the upper part of the piston stroke, register with the ports 19 in cylinder 15. Ports 33 are also disposed obliquely, as shown in Fig. 5. Spiral slots 34 are cut in the boss 32, as shown in Fig. 8.

Figure 1:
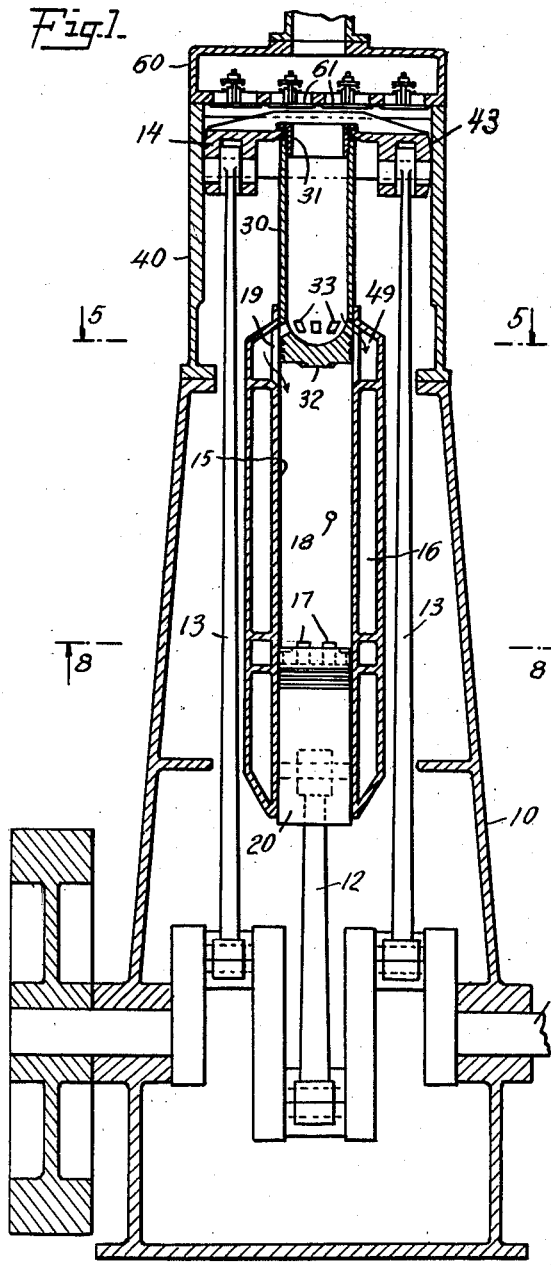

The upper end of piston 20 is constructed to form a chamber 21, closed at the bottom, and with an opening 22 at the top which the boss 32 of piston 30 enters at the end of the compression stroke, as shown in Figs. 2 and 7. Ports 23 are spaced peripherally around chamber 21 which at the outer end of the piston stroke register with the exhaust ports 17, as shown in Figs. 1 and 9.

60 is a cap on the upper end of the head 40. This forms a chamber in open communication with the surrounding air. It is provided with ports having check valves 61 which permit air to pass freely into the chamber 41 but prevent it from passing upwardly therefrom.

The operation is as follows: Upon the inward stroke of pistons 20 and 30 the yoke 14 moves downwardly and draws air through the check valves 61. As the yoke nears the end of its downward stroke it uncovers a port 44 from a chamber 45 in the head 40, which through ports 46 and 47, is in communication with the interior of the engine casing 10, including the crank case. This permits air or other gases within the engine casing to enter the compression chamber 41.

When yoke 14 moves up it closes port 44 and compresses the air above itself. From Fig. 2 it will be seen that the walls of the compression chamber terminate below the head 60 so that the air compressed above yoke 14 will be stored in chambers 48, 48 at the longer sides of chamber 41 as well as in the space above the yoke and inside of piston 30. Chambers 48 are closed at the bottom by a wall 48A. When piston 30 nears the end of its upward stroke, this air will pass through piston 30, ports 33 and 19 into and through an annular chamber 49 which surrounds ports 19 and under the end of the piston into the cylinder 15. The air will be introduced with a whirling motion due to the oblique disposition of ports 33 and 19. When the yoke 14 is at the upper end of its stroke it uncovers port 50 which permits air to enter the crank case from a chamber 51.

At this time the exhaust ports 17 will be opened, first through opening 22, chamber 21 and ports 23 in the upper part of piston 20 when the latter reaches the position in which it is shown in dotted lines in Fig. 9, and later through these same passages and also over the upper end of piston 20, when the piston reaches the position shown in full lines. The exhaust gases will be blown out during this operation and as piston 20 rises to the dotted line position pure air will pass through its chamber 21. Thus, a thorough scavenging is assured.

As pistons 20 and 30 move toward each other air is entrapped between them and compressed until they reach the relative positions in which they are shown in Figs. 2 and 7 in which the only space between them is the chamber 21 in the upper end of piston 20. The whirl of the air, the direction of which is shown by dotted lines in Fig. 6, imparted by the oblique positions of the ports 33 and 19, is continued by the spiral grooves 34 in the end of piston 20. Fuel is injected into chamber 21 through the port 18. This is offset from the axis of the piston, as shown in Fig. 6 so that the fuel is sprayed into the chamber against the direction of movement of the air therein, thereby forming a thorough mixture of fuel and air instantly. This mixture is ignited by the heat of compression in the usual manner.

Figure 10:
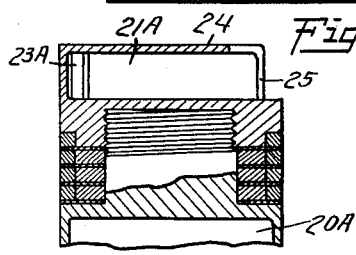
Fig. 10 is a sectional elevation of a modified piston head construction.
Figure 11:
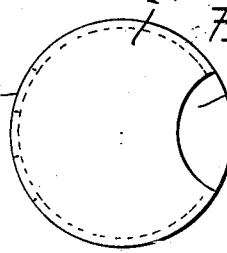
Fig. 11 is a top plan view of the piston shown in Fig. 10.

In Figs. 10 and 11 the piston 20A is constructed with a plate 24 extending over a chamber 21A but cut away as shown at 25 to form an opening opposite the fuel inlet port 18. 23A designates ports in the side wall of chamber 21A. When this construction is used the end of piston 30 is flat. The operation with this arrangement is similar to that already described.

The specific embodiments shown and described are for illustrative purposes only and I intend no limitations other than those imposed by the appended claims.

What I claim is:

1. A piston for internal combustion engines having a closed end, a plate spaced from said end and an annular chamber wall, said closed end, plate and wall forming an ignition chamber and ports through said annular wall, said plate being cut away over one of said ports.

2. In an internal combustion engine, a pair of opposed pistons, one of said pistons having an end thereof constructed to form an ignition chamber having a central circular opening smaller in area than the horizontal cross-sectional area of said chamber and facing the other piston, and said other piston having a boss arranged to project into said opening when the pistons are in juxtaposition.

3. In an internal combustion engine, a pair of opposed pistons, one of said pistons having an end thereof constructed to form an ignition chamber having a central circular opening toward the other piston, and said other piston having a boss arranged to project into said opening when the pistons are in juxtaposition, spiral grooves on said boss, and a fuel inlet port offset from the axis of the pistons.

4. In an internal combustion engine a pair of opposed pistons, one of said pistons having an end thereof constructed to form an ignition chamber having a central circular opening toward the other piston and said other piston having a boss arranged to project into said opening when the pistons are in juxtaposition, means for imparting a whirl to air entrapped within said ignition chamber, and means for injecting fuel laterally into said chamber against the direction of the whirling air therein.

5. In an internal combustion engine, in combination, a pair of opposed pistons, one of said pistons having a closed top and an annular wall formed above said top, a cover member secured to said wall and having a hole formed therein, said annular wall having ports extending therethrough and said wall and said cover member forming an ignition chamber in said last-mentioned piston with the top thereof, and means for injecting oil into said chamber whereby air forced by the other of said pistons into said ignition chamber is mixed thoroughly with oil to cause combustion therein substantially out of contact with the cylinder wall.

6. In an internal combustion engine, in combination, a cylinder, a pair of opposed pistons in said cylinder adapted to reciprocate toward and away from each other, one of said pistons having a closed top and an annular wall formed above said top adjacent the wall of said cylinder, and a cap secured to said annular wall and spaced from said top to form a chamber with said top and said wall, said cap having a hole formed therein and said annular wall having ports formed therein adapted to register with an oil inlet port on the wall of said cylinder whereby air is forced into said chamber and mixed with oil from said inlet port when said pistons reach their innermost position to provide combustion in said chamber out of contact with the wall of said cylinder.

7. In an internal combustion engine, in combination, a cylinder, a pair of pistons in said cylinder adapted to reciprocate toward and away from each other, one of said pistons having a top and an annular wall formed thereabove adjacent the wall of said cylinder, a cap member secured to said annular wall and spaced from said top to form an ignition chamber in said last-mentioned piston, said chamber-forming wall having ports formed therein adapted to register with the oil inlet port of said cylinder, said cap member having a hole formed therein, and a boss member secured to the other of said pistons and adapted to fit within said hole, whereby air is forced into said chamber when said pistons reach their innermost position.

8. In an internal combustion engine, in combination, a cylinder, a pair of reciprocating pistons disposed within said cylinder, one of said pistons having a chamber formed at its end and a hole formed in its top so that said chamber is in communication with said cylinder, said hole being smaller in area than the horizontal cross-sectional area of said chamber, and a boss secured to the end of the other of said pistons and adapted to fit within said hole when said pistons are in their innermost position whereby air is forced from said cylinder into said chamber.

9. In an internal combustion engine, in combination, a cylinder, a pair of reciprocating pistons disposed within said cylinder, one of said pistons having a chamber formed at its end and a hole small in relation to the cross sectional area of said chamber formed in its top so that said chamber is in communication with said cylinder, and a boss secured to the end of the other of said pistons having spiral grooves formed therein so that air from said cylinder is forced into said chamber with a whirling motion as said pistons reach their innermost position.

10. In an internal combustion engine, in combination, a cylinder, a pair of reciprocating pistons disposed within said cylinder, one of said pistons having a chamber formed at its end and a hole formed in its top so that said chamber is in communication with said cylinder, a boss secured to the end of the other of said pistons having spiral grooves formed therein so that air from said cylinder is forced into said chamber with a whirling motion as said pistons reach their innermost position, and means for injecting oil in said chamber laterally against the whirling movement of said air therein.

11. In an internal combustion engine, in combination, a cylinder, and a pair of reciprocating pistons disposed within said cylinder, one of said pistons having a chamber formed at its end and a hole formed in its top so that said chamber is in communication with said cylinder, the area of said hole being smaller than the horizontal cross-sectional area of said chamber, and the other of said pistons having spiral grooves formed in the end thereof facing said last-mentioned piston whereby air in said cylinder is forced into said chamber with a whirling motion when said pistons are moved toward each other.

12. In an internal combustion engine, in combination, a cylinder, a pair of reciprocating pistons disposed within said cylinder, one of said pistons having a closed top and a wall portion extending from said top, said wall forming a chamber on said piston top and having inlet and outlet ports formed therein, and a cover plate on said wall portion, said cover plate having a hole formed therein substantially adjacent one of said ports, said hole being smaller in area than the surface area of said piston top, and the other of said pistons having its free end formed to register with said cover plate when said pistons are in immediate juxtaposition whereby gas is forced from said cylinder into said chamber through said hole as said pistons approach each other and out of said chamber through said inlet and outlet ports when these register with exhaust ports in the cylinder.

13. In an internal combustion engine, in combination, a cylinder having fuel, exhaust, and air inlet ports formed therein, a pair of reciprocating pistons disposed within said cylinder one of said pistons having a closed top, a wall portion extending from said top, said wall forming a chamber on said piston top and having chamber ports formed therein, and a cover plate having an opening therein smaller in area than the surface area of said piston top, and the other of said pistons having its free end formed to register with said cover plate when said pistons are in immediate juxtaposition whereby upon movement of said pistons, when said pistons are substantially at the inner ends of their strokes, gas may enter through said opening into said chamber, and exhaust gases may flow out of said chamber through said chamber ports and into said cylinder exhaust ports to exhaust the gases when said pistons are spaced from each other substantially at the outer ends of their strokes.

14. In an internal combustion engine, in combination, a cylinder having ports formed therein, a pair of reciprocating pistons disposed within said cylinder, a wall extending from the top of one of said pistons and having a cut out portion on one side thereof, said wall having a plurality of ports formed therein, and a cover plate on said piston wall and having a cut-out portion substantially adjacent the cut-out portion of said piston wall whereby a chamber is formed in direct communication with said cylinder and the other of said pistons having its free end formed to register with said cover plate when said pistons are in immediate juxtaposition whereby upon movement of said pistons, when said pistons are substantially in the inner ends of their strokes, gas may enter through some of said chamber ports into said chamber and exhaust gases may flow out of said chamber through some of said chamber ports and into said cylinder ports to exhaust the gases when said pistons are spaced from each other substantially at the ends of their strokes.

WILHELM B. BRONANDER.